United States Patent
Masumoto et al.

(10) Patent No.: US 7,800,649 B2
(45) Date of Patent: Sep. 21, 2010

(54) IMAGE SUPPLY APPARATUS, RECORDING APPARATUS, AND RECORDING SYSTEM, AND CONTROL METHOD AND PROGRAM THEREOF

(75) Inventors: Kazuyuki Masumoto, Kanagawa (JP); Takao Aichi, Tokyo (JP); Akitoshi Yamada, Kanagawa (JP); Fumihiro Goto, Kanagawa (JP); Kentaro Yano, Kanagawa (JP); Ruriko Mikami, Kanagawa (JP); Hiromitsu Hirabayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1471 days.

(21) Appl. No.: 10/921,977

(22) Filed: Aug. 20, 2004

(65) Prior Publication Data

US 2005/0052690 A1    Mar. 10, 2005

(30) Foreign Application Priority Data

Aug. 22, 2003   (JP) .............................. 2003-298798

(51) Int. Cl.
*G06F 3/12* (2006.01)
*G06F 13/10* (2006.01)

(52) U.S. Cl. .................... 348/207.2; 358/1.1; 358/1.15; 714/55

(58) Field of Classification Search ................... 714/55; 358/1.1, 1.15; 348/207.2
See application file for complete search history.

(56) References Cited

U.S. PATENT DOCUMENTS

| 6,560,662 B1 * | 5/2003 | Sakai .......................... 710/104 |
| 6,907,460 B2 | 6/2005 | Loguinov et al. ........... 709/224 |
| 7,057,750 B2 | 6/2006 | Tanaka ....................... 358/1.13 |
| 7,417,956 B2 * | 8/2008 | Nakazawa ................... 370/252 |
| 2002/0046311 A1 | 4/2002 | Kageyama ................... 710/105 |

FOREIGN PATENT DOCUMENTS

| CN | 1412717 | 4/2003 |
| CN | 1430833 | 7/2003 |
| JP | 11136414 | 5/1999 |
| JP | 2003-61034 | 2/2003 |
| JP | 2003131969 | 5/2003 |
| JP | 2003-188794 | * 6/2003 |
| JP | 2003224793 | 8/2003 |
| KR | 2002-11927 | 2/2002 |
| WO | WO 01/76304 | 10/2001 |
| WO | WO 02/058309 | 7/2002 |

OTHER PUBLICATIONS

"White Paper of CIPA DC-001-2003: Digital Photo Solutions for Imaging Devices", Feb. 3, 2003, Camera & Imaging Products Association.*
M. S. Allen, et al., "Adaptive Timeout Discovery using the Network Weather Service", High Performance Distributing Computing, 2002. HPDC-11 2002. Proceedings. 11th IEEE International Symposium on Jul. 23-26, 2002, pp. 35-41.
F. Halsall, "The Open Systems Interconnections (OSI) Seven-Layer Model", Communications Handbook, 1997, pp. 567-576.

* cited by examiner

*Primary Examiner*—King Y Poon
*Assistant Examiner*—Lawrence E Wills
(74) *Attorney, Agent, or Firm*—Fitzpatrick, Cella, Harper & Scinto

(57) ABSTRACT

After applications installed in a DSC and PD printer establish a communication procedure, the DSC issues a request to the PD printer. A time required for data transfer involved in the request is predicted. An elapse time until a response is received from the PD printer in response to the request is estimated on the basis of the predicted time. If no response is returned from the PD printer within the estimated elapse time, the request is disabled.

8 Claims, 14 Drawing Sheets

FIG. 7

```
<startJob>
  <jobConfig>
    <quality>50000000</quality>           — 700
    <paperSize>51060000</paperSize>       — 701
    <paperType>52020000</paperType>       — 702
    <fileType>53000000</fileType>         — 703
    <datePrint>54010000</datePrint>       — 704
    <fileNamePrint>55000000</fileNamePrint> — 705
    <imageOptimize>56000000</imageOptimize> — 706
    <fixedSize>58030000</fixedSize>       — 707
    <cropping>59000000</cropping>         — 708
  </jobConfig>
  <printInfo>
    <fileID>00000001</fileID>             — 709
    <date>2002/10/28</date>               — 710
  </printInfo>
</startJob>
```

720 → jobConfig block
721 → printInfo block

FIG. 8A

| prtPID | ImagePath | copyID | progress | imagePrinted |
|---|---|---|---|---|

FIG. 8B

| dpsPrintServiceStatus | jobEndReason | errorStatus | errorReason | disconnectEnable | CapabilityChanged | newJobOK |
|---|---|---|---|---|---|---|

FIG. 9A

```
<input>
  <getCapability>
    <Capability>
      <layouts/> ~ 901
    </Capability>
  </getCapability>
</input>
```

FIG. 9B

```
<output>
  <result>10000000</result>
  <getCapability>
    <Capability> ~ 902
      <layouts/> ~ 903
        57000000  57010000  57020000 ~ 904
      </layouts> ~ 905
    </Capability> ~ 906
  </getCapability>
</output>
```

F I G. 10A

```
<input>
  <getFileInfo>
    <fileID>00000001</fileID>
  </getFileInfo>
</input>
```

F I G. 10B

```
<output>
  <result>10000000</result>
  <getFileInfo>
    <fileType>53010000</fileType>
    <fileSize>000F4240</fileSize>
  </getFileInfo>
</output>
```

IMAGE SUPPLY APPARATUS, RECORDING APPARATUS, AND RECORDING SYSTEM, AND CONTROL METHOD AND PROGRAM THEREOF

FIELD OF THE INVENTION

The present invention relates to an image supply apparatus, a recording apparatus, and a recording system, and a control method and program thereof.

BACKGROUND OF THE INVENTION

In recent years, digital cameras (image sensing devices) which can sense an image and can convert the sensed image into digital image data by a simple operation have been popularly used. When an image sensed by such camera is printed and is used as a photograph, it is a common practice to temporarily download the sensed digital image data from a digital camera to a PC (computer), to execute an image process by that PC, and to output the processed image data from the PC to a color printer, thus printing an image.

By contrast, a color print system which allows a digital camera to directly transfer digital image data to a color printer without the intervention of any PC and can print it out (to be referred to as a direct print process hereinafter), a so-called photo-direct (PD) printer which can receive a memory card, which is mounted on a digital camera and stores sensed images, and can print sensed images, and the like have recently been developed (see Japanese Patent Laid-Open No. 2003-061034).

Such direct print process is originally a model-dependent print function that can be implemented between a camera and printer of an identical vendor. However, in recent years, the standardization in these industries has progressed, and an environment that allows a direct print process by connecting a camera and printer of different vendors irrespective of manufacturers has been created.

In this manner, in order to implement a direct print function independent from vendors, at least one of a device that supplies image data and an image output device that receives and print the image data may acquire functions (to be referred to as capability data hereinafter) of the other device. If the direct print function is implemented by operating a camera interface by a user, the camera must acquire capability data of a printer, which is used to print an image, in advance. For this purpose, a command for exchanging capability data between the camera and printer must be defined, a communication specification of the command must be defined, and the command must be exchanged according to the communication specification. Then, each other's functions are confirmed by interpreting the command, and a print command (to be referred to as a print job hereinafter) according to a print instruction from the user must be appropriately generated in accordance with the capability data of the printer. That is, the camera must be designed to be able to generate a plurality of print jobs in correspondence with the capability data of the printer, and such design imposes a very heavy load on the camera.

When a request using a command and a response to the request are exchanged so as to acquire such function information, a duration of time-out of the command is often not specified. Even when print data begins to be exchanged immediately after generation of a request using the command, since such process is done in a lower layer such as a transport layer, physical layer, or the like, an application cannot often recognize the beginning of data transfer. In such case, the application may determine that a response is merely late, and may execute a time-out process when the set duration of time-out has elapsed, although data transfer is in progress.

SUMMARY OF THE INVENTION

The present invention has been made in consideration of the above problems, and has as its feature to provide an image supply apparatus, recording apparatus, and recording system, and a control method and program thereof, which exchange a request using a command and a response between an image supply apparatus and recording apparatus, and accurately estimate a time-out until a response in the recording apparatus when data is transmitted from the image supply apparatus, so as to quickly attain status recovery when a communication error or the like has occurred.

According to an aspect of the present invention, there is provided with a recording system in which an image supply apparatus and a recording apparatus communicate via a versatile interface, for transmitting image data from the image supply apparatus to the recording apparatus and recording, the system is comprising:

issuance means for issuing a request from the image supply apparatus to the recording apparatus after applications installed in the image supply apparatus and recording apparatus establish a communication procedure;

prediction means for predicting a time required for data transfer involved in the request;

estimation means for estimating an elapse time until a response from the recording apparatus is received in response to the request, on the basis of the time predicted by the prediction means; and means for disabling the request in a case where no response is returned from the recording apparatus within the elapse time estimated by the estimation means.

According to an aspect of the present invention, there is provided with a recording apparatus for communicating with an image supply apparatus via a versatile interface, and recording image data received from the image supply apparatus, the apparatus is comprising:

issuance means for issuing a request to the image supply apparatus after an installed application establishes a communication procedure;

prediction means for predicting a time required for data transfer involved in the request;

estimation means for estimating an elapse time until a response from the image supply apparatus is received in response to the request, on the basis of the time predicted by the prediction means; and means for disabling the request in a case where no response is returned from the image supply apparatus within the elapse time estimated by the estimation means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 7 depicts a view for explaining an actual example of a print start command issued by the DSC according to the embodiment of the present invention;

FIG. 8A depicts a view for explaining JobStatus which is sent from the PD printer to the DSC according to the embodiment of the present invention, and FIG. 8B depicts a view for explaining DeviceStatus;

FIGS. 9A and 9B depict views for explaining exchange of capability data of the PD printer according to the embodiment of the present invention, in which FIG. 9A shows an example of a capability request command from the DSC to the PD printer, and FIG. 9B shows a response command from the PD printer to the DSC;

FIGS. 10A and 10B depict views for explaining an example of acquisition of file information of an image to be printed according to the embodiment of the present invention, in which FIG. 10A shows an example of a file request command from the PD printer to the DSC, and FIG. 10B shows an example of a command upon sending an image file from the DSC to the PD printer;

DESCRIPTION OF THE PREFERRED EMBODIMENTS

Preferred embodiments of the present invention will be described in detail hereinafter with reference to the accompanying drawings.

First Embodiment of Present Invention

<Overview of Printer>

Figure 1:
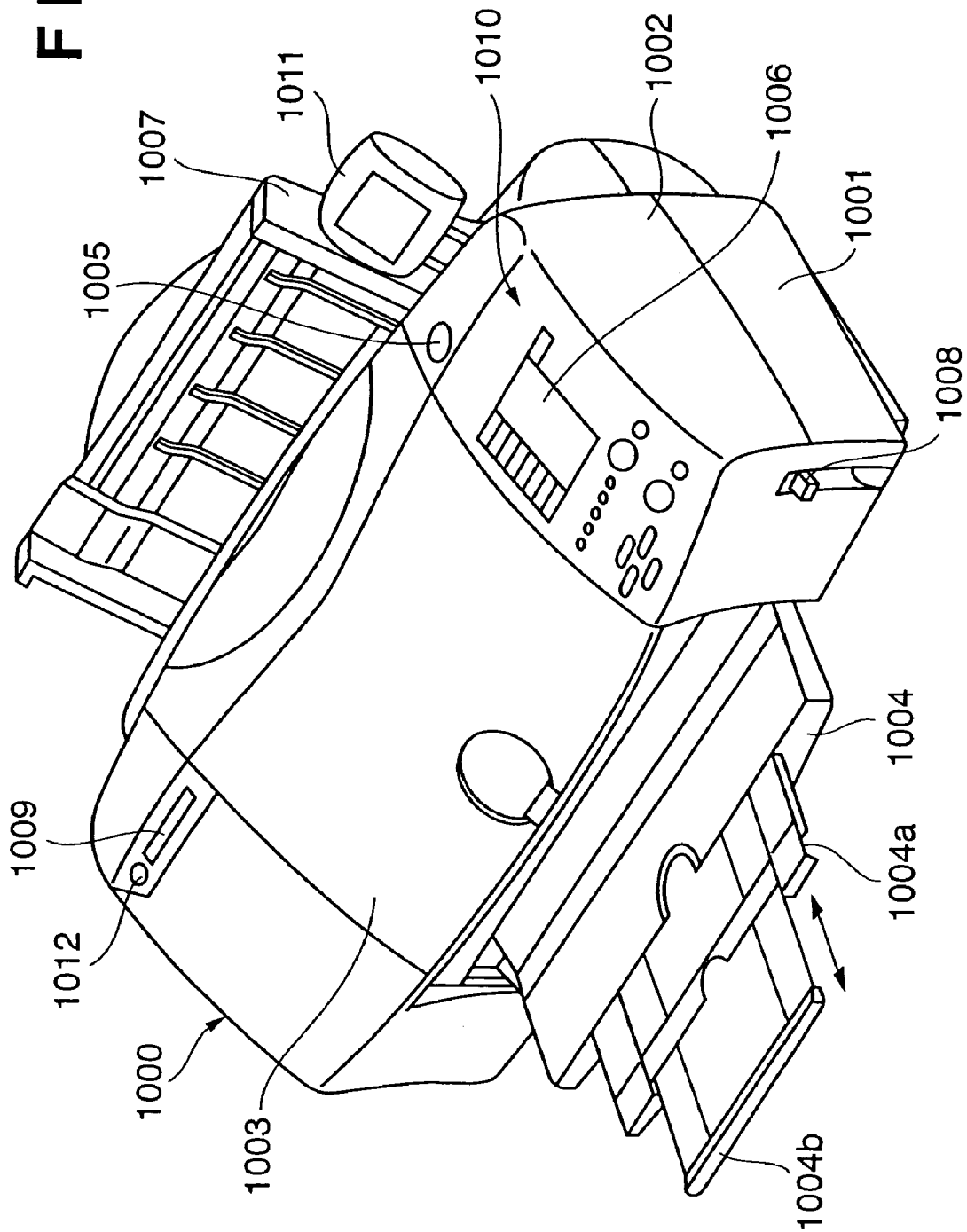
FIG. 1 depicts a schematic perspective view of a PD printer according to an embodiment of the present invention.

FIG. 1 depicts a schematic perspective view of a photo-direct printer device (to be referred to as a PD printer hereinafter) 1000 according to an embodiment of the present invention. This PD printer 1000 has a function of printing data received from a host computer (PC) as a normal PC printer, and a function of printing image data directly read from a storage medium such as a memory card or the like, and printing image data received from a digital camera, PDA, or the like.

Referring to FIG. 1, a main body which forms a housing of the PD printer 1000 according to this embodiment has a lower case 1001, upper case 1002, access cover 1003, and exhaust tray 1004 as exterior members. The lower case 1001 nearly forms the lower half portion of the PD printer 1000, and the upper case 1002 nearly forms the upper half portion of the main body. By combining these cases, a hollow structure which has a storage space that stores mechanisms to be described later is formed. Openings are respectively formed on the upper and front surfaces of the main body. One end portion of the exhaust tray 1004 is rotatably held by the lower case 1001, and rotation of the tray 1004 opens/closes the opening formed on the front surface of the lower case 1001. Hence, upon executing a print operation, the exhaust tray 1004 is rotated toward the front surface side to open the opening, so that printed sheets (including plain paper, dedicated paper, resin sheet, and the like; to be simply referred to as a sheet hereinafter) can be discharged from the opening. The discharged sheets are stacked on the exhaust tray 1004 in turn. The exhaust tray 1004 stores two auxiliary trays 1004a and 1004b. When these auxiliary trays are pulled out as needed, the loading area of sheets can be enlarged/reduced in three steps.

One end portion of the access cover 1003 is rotatably held by the upper case 1002 to be able to open/close the opening formed on the upper surface of the main body. When the access cover 1003 is opened, a printhead cartridge (not shown), ink tanks (not shown), or the like housed in the main body can be exchanged. Although not shown, when the access cover 1003 is opened/closed, a projection formed on the rear surface of the cover 1003 rotates a cover open/close lever. By detecting the rotation position of the lever using a microswitch or the like, the open/close state of the access cover 1003 is detected.

A power key 1005 is arranged on the upper surface of the upper case 1002. A control panel 1010 which comprises a liquid crystal display 1006, various key switches, and the like is provided on the right side of the upper case 1002. The structure of the control panel 1010 will be described in detail later with reference to FIG. 2. Reference numeral 1007 denotes an automatic feeder which automatically feeds a sheet into the device main body. Reference numeral 1008 denotes a paper gap select lever which is used to adjust the gap between the printhead and sheet. Reference numeral 1009 denotes a card slot which receives an adapter that can receive a memory card. Via this adapter, image data stored in the memory card can be directly taken and printed. As this memory card (PC), for example, a compact flash® memory card, smart media card, memory stick, and the like are available. Reference numeral 1011 denotes a viewer (liquid crystal display unit) which is detachable from the main body of this PD printer 1000, and is used to display an image for one frame, index images, and the like, when the user wants to search images stored in the PC card for an image to be printed. Reference numeral 1012 denotes a USB terminal used to connect a digital camera (to be described later). Also, another USB connector used to connect a personal computer (PC) is provided on the rear surface of this PD printer 1000.

<Overview of Printer Console>

Figure 2:
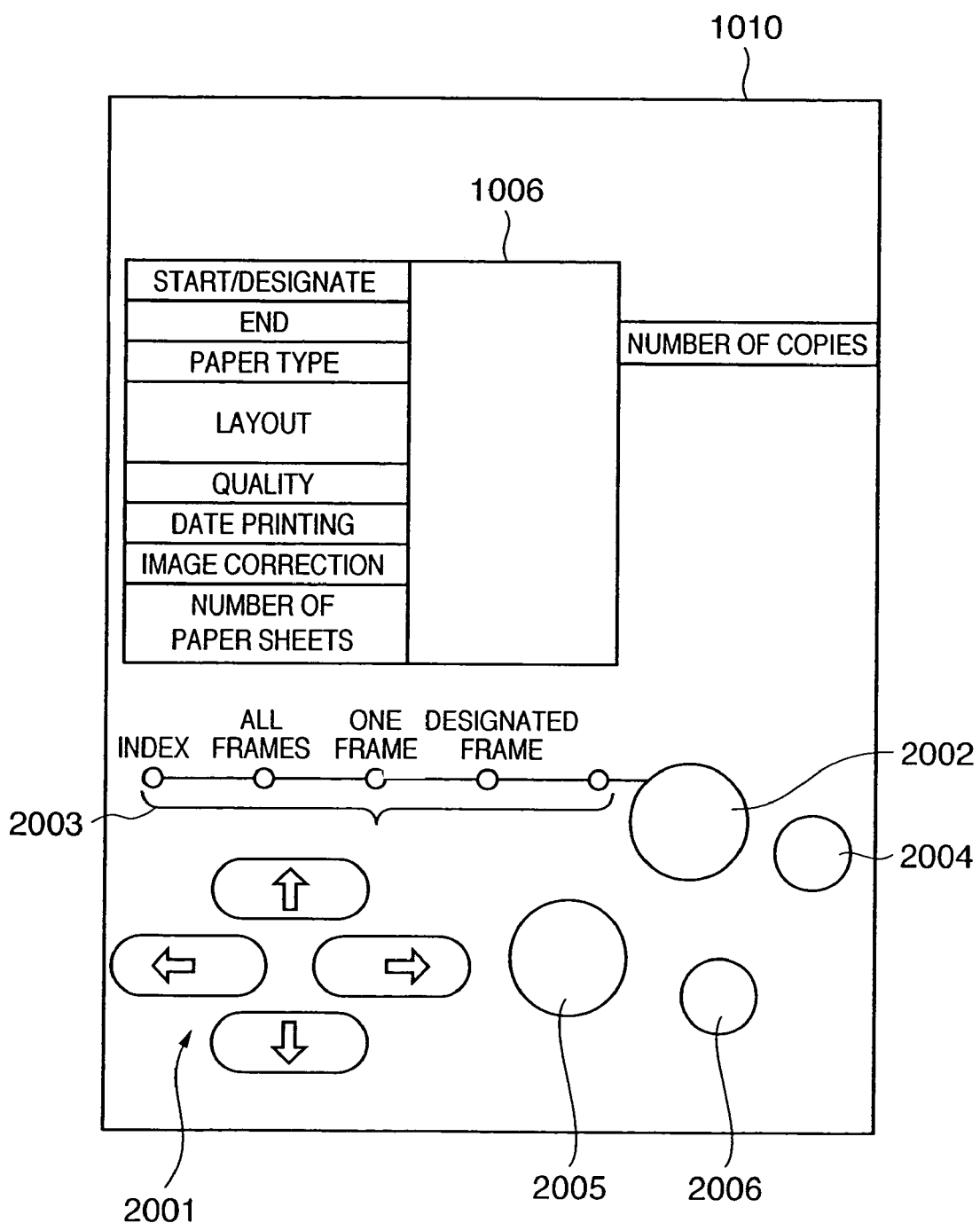
FIG. 2 depicts a schematic view of a control panel of the PD printer according to the embodiment of the present invention.

FIG. 2 depicts a schematic view of the control panel 1010 of the PD printer 1000 according to this embodiment.

Referring to FIG. 2, the liquid crystal display unit 1006 displays menu items used to make various setups of data associated with item names printed on the right and left sides of the unit 1006. The items displayed here include, e.g., the first photograph number of a photograph image to be printed of a plurality of photograph image files or designated frame number (start frame designation/print frame designation), the last photograph number of a photograph image to be printed at the end of a print process (end), the number of prints (number of copies), the type of sheet used in a print process (paper type), the setup of the number of photographs to be printed per sheet (layout), designation of print quality (quality), designation as to whether or not to print a photographing date (date printing), designation as to whether or not to print a photograph after correction (image correction), display of the number of sheets required for the print process (number of sheets), and the like. These items are selected or designated using cursor keys 2001. Reference numeral 2002 denotes a mode key. Every time this key is pressed, a print mode (index print, all-frame print, one-frame print, designated-frame print, and the like) can be switched, and a corresponding one of LEDs 2003 is turned on in accordance with the selected print mode. Reference numeral 2004 denotes a maintenance key which is used to do maintenance of the printer (e.g., cleaning of the printhead, and the like). Reference numeral 2005 denotes a print start key which is pressed when the start of a print process is instructed or when the maintenance setup is settled. Reference numeral 2006 denotes a print cancel key which is pressed when a print process or maintenance is canceled.

<Overview of Printer Electric Specification>

The arrangement of principal part associated with the control of the PD printer 1000 according to this embodiment will be described below with reference to FIG. 3. Note that the same reference numerals in FIG. 3 denote parts common to those in the above drawings, and a description thereof will be omitted.

Figure 3:
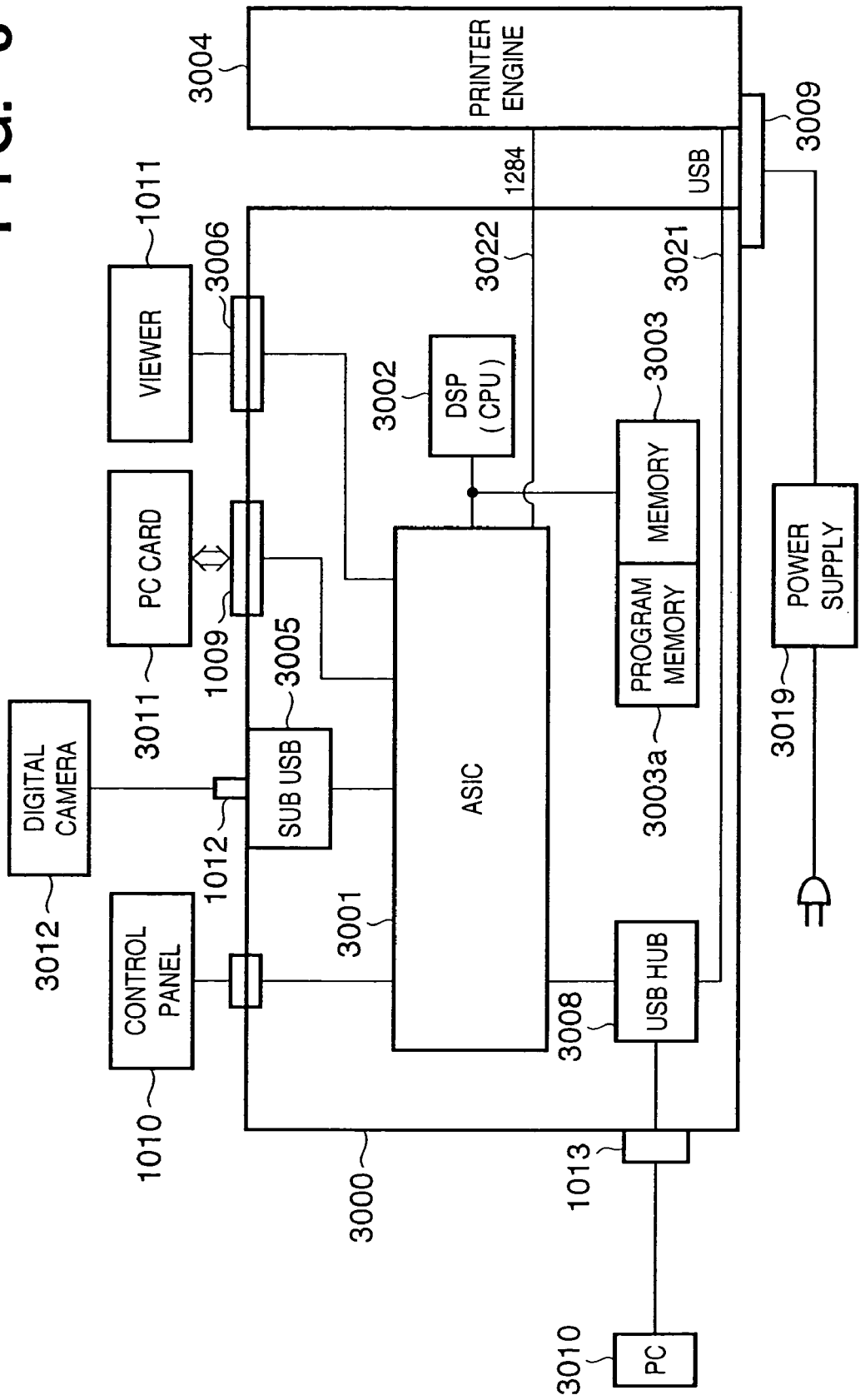
FIG. 3 is a block diagram showing the arrangement of principal part associated with control of the PD printer according to the embodiment of the present invention.

Referring to FIG. 3, reference numeral 3000 denotes a controller (control board). Reference numeral 3001 denotes an ASIC (application specific LSI). Reference numeral 3002 denotes a DSP (digital signal processor), which includes a CPU and executes various control processes to be described later, and image processes such as conversion from a luminance signal (RGB) into a density signal (CMYK), scaling, gamma conversion, error diffusion, and the like. Reference numeral 3003 denotes a memory, which has a program memory 3003a for storing a control program to be executed by the CPU of the DSP 3002, a RAM area for storing a running program, and a memory area that serves as a work area for storing image data and the like. Reference numeral 3004 denotes a printer engine. In this embodiment, the printer is equipped with a printer engine of an ink-jet printer which prints a color image using a plurality of color inks. Reference numeral 3005 denotes a USB connector as a port for connecting a digital camera (DSC) 3012. Reference numeral 3006 denotes a connector for connecting the viewer 1011. Reference numeral 3008 denotes a USB hub (USB HUB). When the PD printer 1000 executes a print process based on image data from a PC 3010, the USB hub 3008 allows data received from the PC 3010 to pass through it, and outputs the data to the printer engine 3004 via a USB 3021. In this way, the PC 3010 connected to the printer 1000 can execute a print process by directly exchanging data, signals, and the like with the printer engine 3004 (the printer serves as a normal PC printer). Reference numeral 3009 denotes a power supply connector, which inputs a DC voltage which is converted from commercial AC power by a power supply 3019. The PC 3010 is a general personal computer. Reference numeral 3011 denotes a memory card (PC card) mentioned above; and numeral 3012 denotes a digital camera (DSC: Digital Still Camera).

Note that signals are exchanged between this controller 3000 and printer engine 3004 via the aforementioned USB 3021 or an IEEE1284 bus 3022.

<Overview of Digital Camera>

Figure 4:
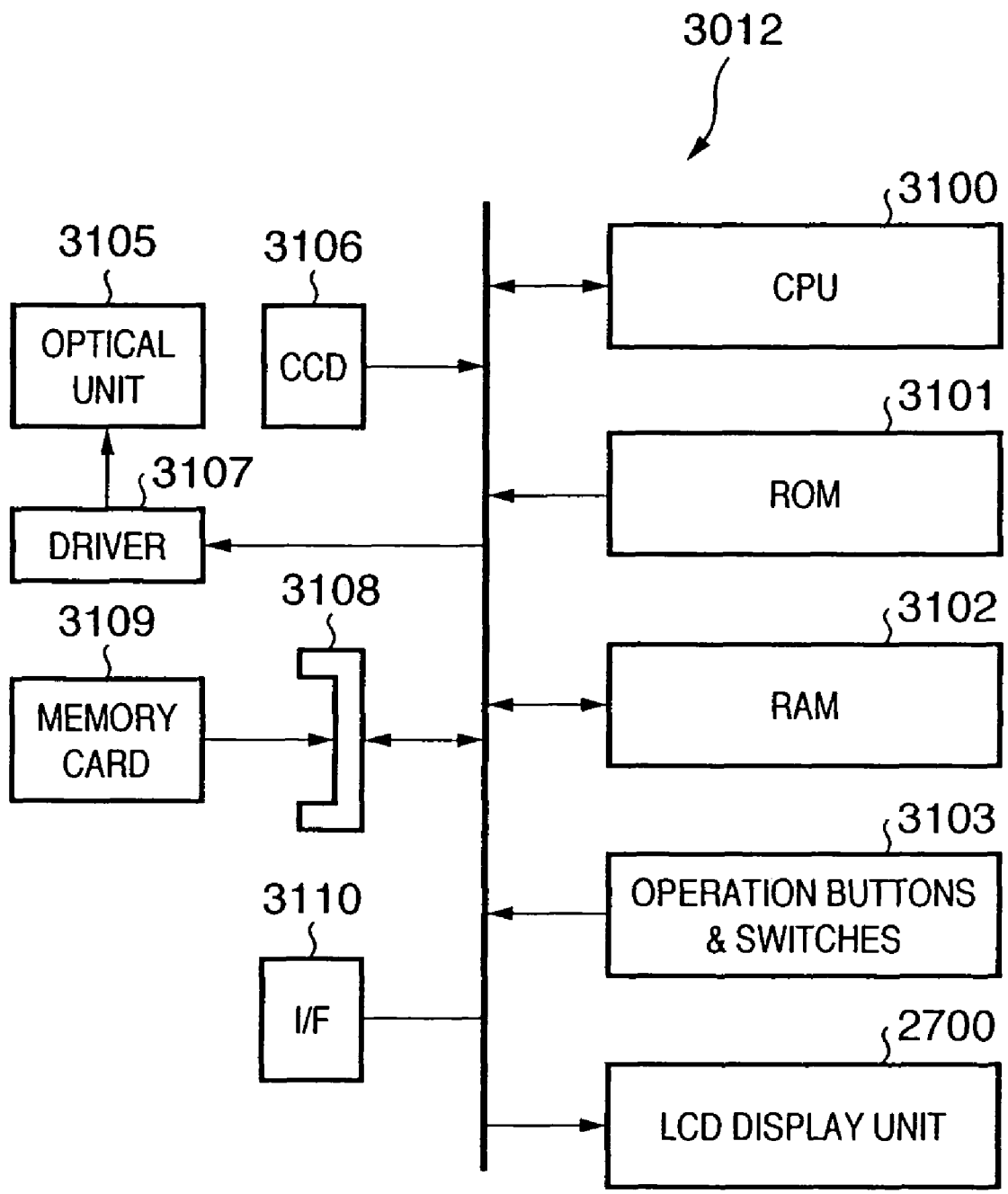
FIG. 4 is a block diagram showing the arrangement of a DSC according to the embodiment of the present invention.

FIG. 4 is a block diagram showing the arrangement of the DSC (digital camera) 3012 according to this embodiment.

Referring to FIG. 4, reference numeral 3100 denotes a CPU which controls the overall DSC 3012; and numeral 3101 denotes a ROM that stores the processing sequence by the CPU 3100. Reference numeral 3102 denotes a RAM which is used as a work area of the CPU 3100; and numeral 3103 denotes a switch group which is used to make various operations, and includes a shutter, mode switch, select switch, cursor keys, and the like. Reference numeral 2700 denotes a liquid crystal display unit which is used to display a video picture that is captured currently, and images photographed and stored in the memory card, and to display a menu upon making various setups. Reference numeral 3105 denotes an optical unit which mainly comprises a lens and its drive system. Reference numeral 3106 denotes a CCD element; and numeral 3107 denotes a driver for controlling to drive the optical unit 3105 under the control of the CPU 3100. Reference numeral 3108 denotes a connector used to connect a storage medium 3109 (compact flash® memory card, smart media, or the like); and numeral 3110 denotes a USB interface (slave side of the USB) used to connect a PC or the PD printer in this embodiment.

<Overview of Camera/printer Connection>

Figure 5:
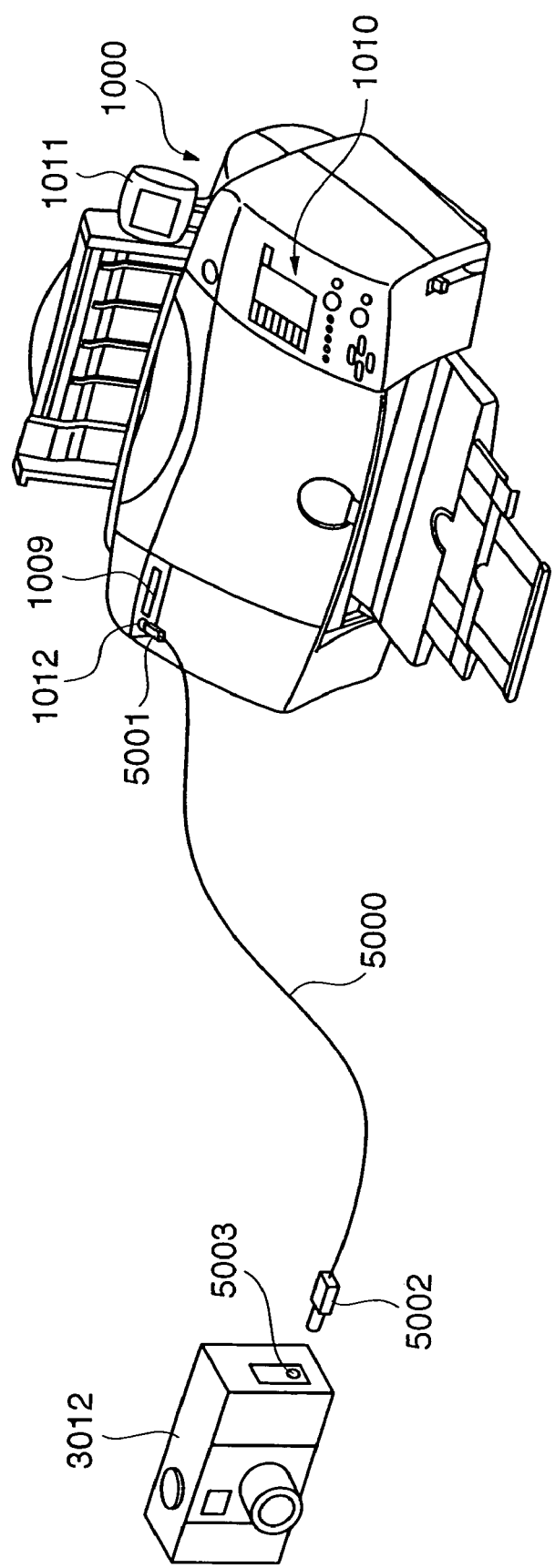
FIG. 5 depicts a view for explaining connection between the PD printer and digital camera according to the embodiment of the present invention.

FIG. 5 depicts a view for explaining connection between the PD printer 1000 and DSC 3012 according to this embodiment. The same reference numerals in FIG. 5 denote parts common to those in the above drawings, and a description thereof will be omitted.

Referring to FIG. 5, a cable 5000 comprises a connector 5001 which is connected to the connector 1012 of the PD printer 1000, and a connector 5002 which is connected to a connector 5003 of the digital camera 3012. The digital camera 3012 can output image data saved in its internal memory via the connector 5003. Note that the digital camera 3012 can adopt various arrangements, e.g., an arrangement that comprises an internal memory as storage means, an arrangement that comprises a slot for receiving a detachable memory card, and so forth. When the PD printer 1000 and digital camera 3012 are connected via the cable 5000 shown in FIG. 5, image data output from the digital camera 3012 can be directly printed by the PD printer 1000.

An overview of the operation in the print system including the DSC 3012 and PD printer 1000 based on the above arrangements will be described below. Note that in the print system according to this embodiment, the DSC 3012 and PD printer 1000 can make operations that follow the specification of a sequence DPS (Direct Print System) according to this embodiment.

Figure 14:
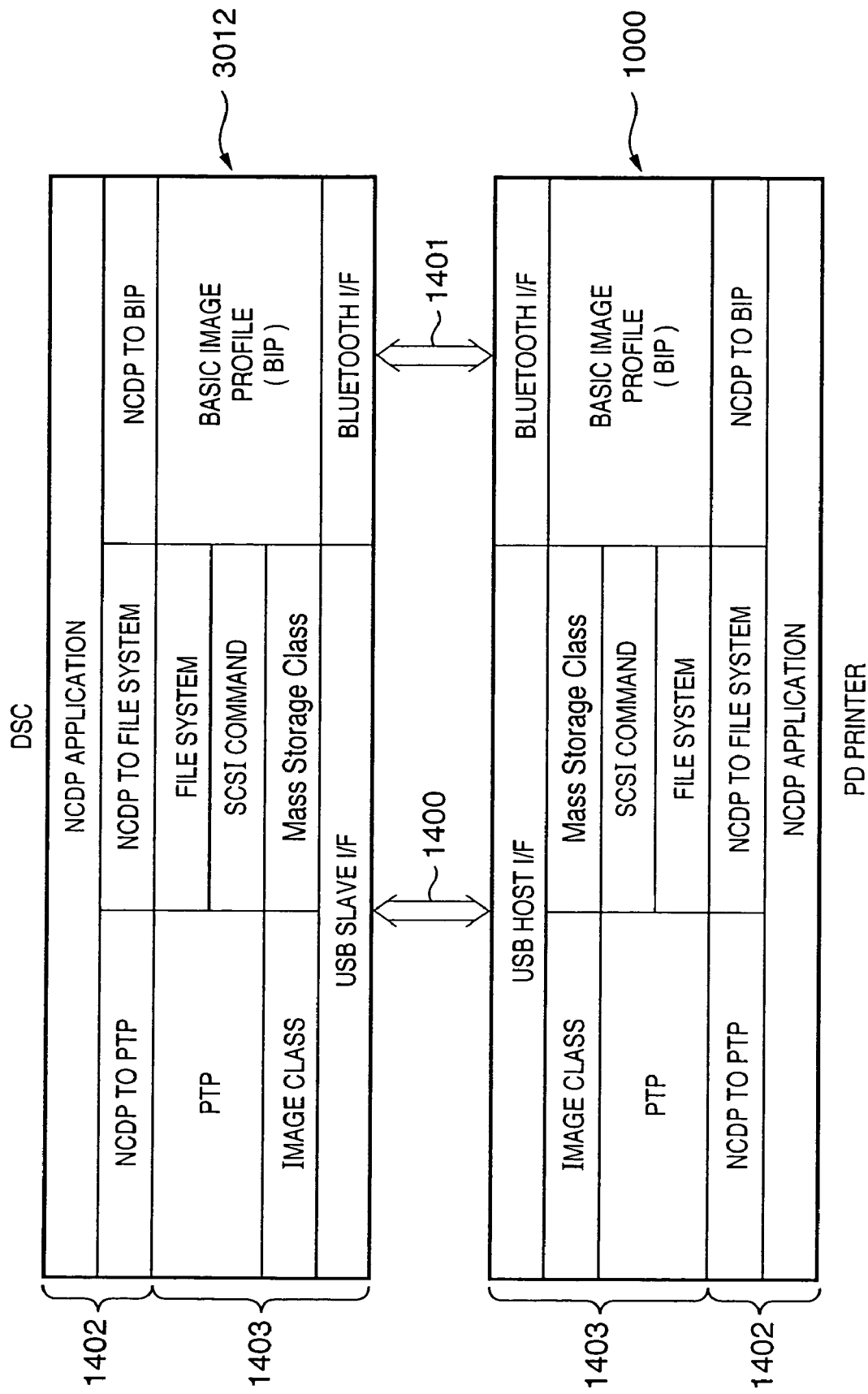
FIG. 14 depicts a schematic view for explaining the software configuration of a PD printer and digital camera which support NCDP according to the embodiment of the present invention.

FIG. 14 shows communication layers.

Referring to FIG. 14, reference numeral 1400 denotes a USB interface; and numeral 1401 denotes a Bluetooth interface. Reference numeral 1402 denotes an application layer which is built in upon forming an NCDP system. Reference numeral 1403 denotes a layer that implements existing protocols and interfaces. In FIG. 14, PTP (Picture Transfer Protocol), SCSI, BIP (Basic Image Profile) of Bluetooth, and the like are installed. NCDP according to this embodiment is premised on that an architecture such as a protocol layer and the like is adopted, and NCDP is supported as an application on the architecture. In this case, the PD printer 1000 and digital camera 3012 are respectively defined as USB host and USB slave; they have the same NCDP configurations, as shown in FIG. 14.

In the following description, a request and a response to that request are information to be exchanged under the control of a predetermined application that runs on the application layer. Actual data such as image data, capability information, and the like use layers (e.g., a transport layer and physical layer) lower than the application layer.

Note that the correspondence between the types of information to be communicated, and the communication layers that actually exchange such information is not limited to this. However, this embodiment is particularly effective when a layer that actually exchanges image data and the like in response to a request is lower than a layer that exchanges a request/response.

<Overview of Direct Print>

Figure 6:
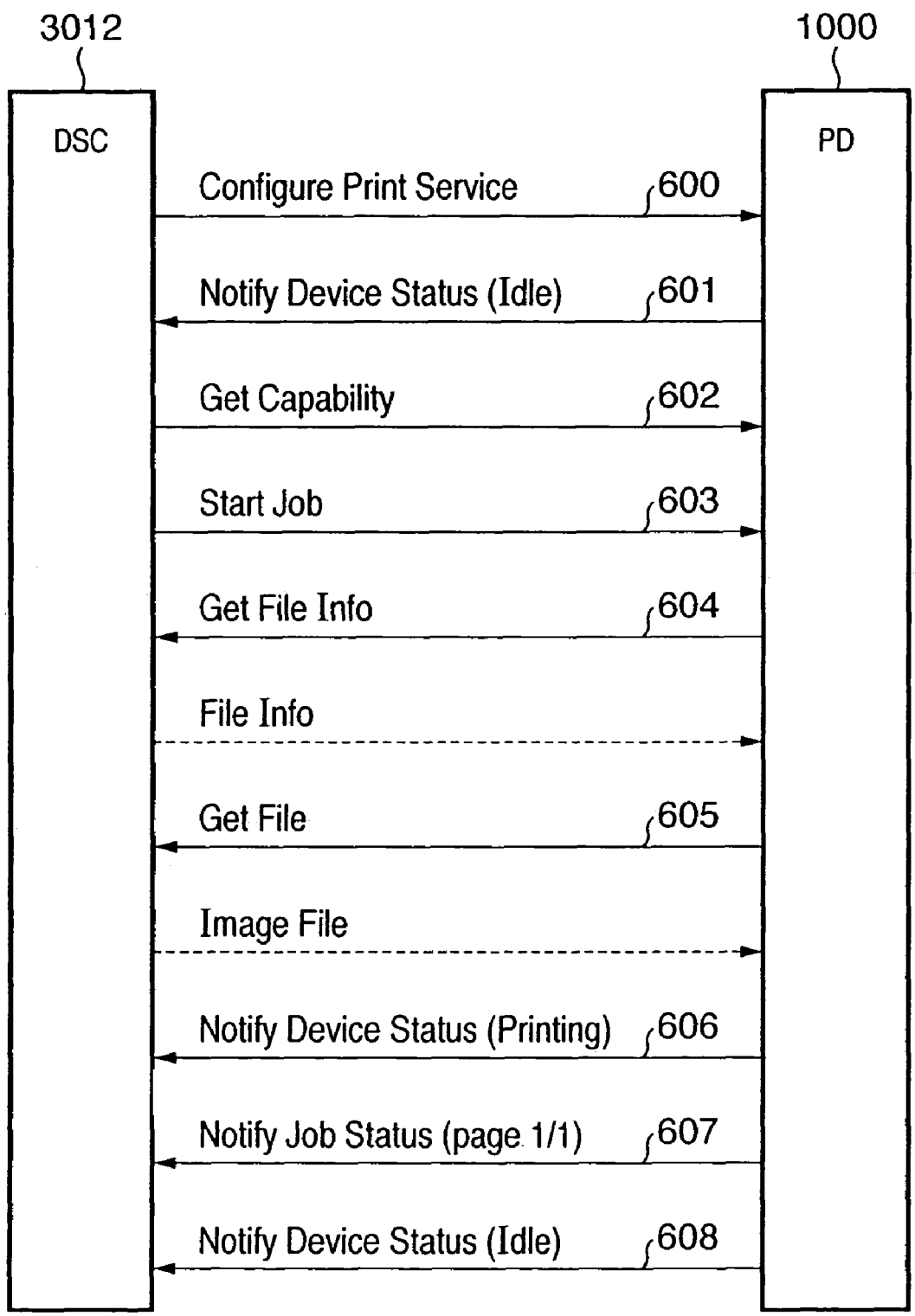
FIG. 6 is a chart for explaining exchange of commands between the PD printer and DSC in a print system according to the embodiment of the present invention.

FIG. 6 is a chart for explaining a rough signal flow when the DSC 3012 issues a print request to the PD printer 1000 to execute a print process in the print system according to this embodiment.

This processing sequence is executed after the PD printer 1000 and DSC 3012 are connected via the USB cable 5000 and confirm each other that they comply with the DPS specification. The DSC 3012 sends "ConfigurePrintService" to the PD printer 1000 to check the status of the PD printer 1000 (600). In response to this, the PD printer 1000 notifies its status ("idle" in this case) at that time (601). Since the PD printer 1000 is "idle" in this case, the DSC 3012 sends an inquiry of capability data of the PD printer 1000 (602), and issues a print start request (StartJob) according to the capability data (603). Note that this print start request is issued from the DSC 3012 to the PD printer 1000 under the condition that "newJobOK" (to be described later) in status information sent from the PD printer 1000 is "True" (601).

In response to this print start request, the PD printer 1000 requests the DSC 3012 to send file information on the basis of the file ID of designated image data to be printed (GetFileInfo) (604). In response to this request, the DSC 3012 sends the requested file information (FileInfo). This file information includes information such as a file size and the like. When the PD printer 1000 determines that it can receive and process the file information, it requests the DSC 3012 to send the file information (GetFile) (605). In response to this request, image data of the requested file (ImageFile) is sent from the DSC 3012 to the PD printer 1000. When the PD printer 1000 starts a print process, status information indicating "Printing" is sent from the PD printer 1000 to the DSC 3012 using "NotifyDeviceStatus" (606). Upon completion of a print process for one page, the PD printer 1000 notifies the status using "NotifyJobStatus" (607) at the beginning of the process for the next page. If only one page is to be printed, the PD printer 1000 notifies "idle" using "NotifyJobStatus" (608) (NotifyJobStatus(Idle)).

For example, in case of N-up print that lays out and prints a plurality of (N) images per one page, every time N images are printed, "NotifyJobStatus" (607) is sent from the PD printer 1000 to the DSC 3012. The issuance timings of "NotifyJobStatus" and "NotifyDeviceStatus" and the acquisition order of image data in this embodiment are a merely example, and various cases may occur depending on product specifications.

Note that this print process includes a case wherein the DSC 3012 transmits a print start request (StartJob), which includes the file IDs of image data to be printed together, to execute a print process, and a case wherein the DSC 3012 transmits a print start request (StartJob), which includes only the file ID of a DPOF file used in normal photo development, to the PD printer 1000, which interprets the DPOF file to acquire the file ID of required image data, and prints it out.

<Overview of Print Job>

FIG. 7 depicts a view for explaining an actual example of a print start request command issued from the DSC 3012 to the PD printer 1000.

Referring to FIG. 7, reference numeral 720 denotes the configuration (jobConfig) of this print job; and numeral 721 denotes print information (printInfo).

The configuration 720 will be explained first. A tag 700 designates image quality to be printed (quality), which includes, e.g., "standard", "high image quality", and the like. A tag 701 designates a paper size (paperSize), and a tag 702 designates a paper type (papertype), which includes, e.g., "plain paper", "photo paper", "ink-jet dedicated paper", and the like. A tag 703 designates a type (fileType) of an image file to be printed. For example, when the DPOF is used, it is designated by this tag. A tag 704 designates the presence/absence of date print (datePrint); numeral 705 denotes the presence/absence of file name print (fileNamePrint); numeral 706 denotes image optimization ON/OFF (imageOptimize); numeral 707 denotes fixed size print (fixedSize); and numeral 708 denotes the presence/absence of print of a designated range of an image (cropping). The print information 721 includes a file ID (fileID) 709 and date information (date) 710.

FIGS. 8A and 8B depict views for explaining information included in JobStatus and DeviceStatus above. Note that JobStatus in FIG. 8A and DeviceStatus in FIG. 8B are sent from the PD printer 1000 to the DSC 3012. The DSC 3012 can send a transmission request of these kinds of information to the PD printer 1000 at an arbitrary timing.

Referring to FIG. 8A, "prtPID", "ImagePath", and "copyID" are enabled, in a case where print of a DPOF file is designated. Note that "prtPID" indicates identification information (ID) of a print section designated by the DPOF file, "ImagePath" indicates path information required to specify an image file designated by the DPOF file, and "copyID" indicates which of pages is being printed in practice upon designating a print process of a plurality of pages. In case of print of the DPOF file, the DSC 3012 describes "fileID" of the DPOF file in a print start request (StartJob), and transmits the request to the PD printer 1000. In response to this, the PD printer 1000 can start printing of the DPOF file. The PD printer 1000 acquires the DPOF file based on "fileID" of the DPOF file, and executes "GetFileID" to specify "fileID" of an image file designated in the DPOF file. The PD printer 1000 then requests the DSC 3012 to send the image file, and acquires the image data. In this manner, an image designated by the DPOF file can be printed. During execution of the print process based on the DPOF file, the PD printer 1000 notifies the DSC 3012 of "prtPID", "ImagePath", and "copyID" which indicate the current status of the print process using "NotifyJobStatus".

When the print process of the DPOF file is interrupted for some reason, and is restarted, that print process is restarted from the head of a page, the print process of which is canceled.

"progress" indicates a page which is currently printed of the designated number of pages to be printed (N/T). Note that N indicates the current print page, and T indicates the total number of pages to be printed. Also, "imageprinted" indicates the number of printed images.

DeviceStatus shown in FIG. 8B will be explained below.

"dpsPrintServiceStatus" indicates the status of the PD printer 1000, and is sent to the DSC 3012. This status information includes idle, print, and pause states. "jobEndReason" indicates end status of a print process, and is sent to the DSC 3012 upon completion of the print process of the last page. "errorStatus" indicates error status, and is notified when an error has occurred. "errorReason" indicates the reason for occurrence of the error, and is sent together with "errorStatus". "disconnectEnable" indicates that a print process can be made even when the USB cable 5000 is disconnected, and is sent from the PD printer 1000 to the DSC 3012. "CapabilityChanged" indicates that capability data in the PD printer 1000 has changed, and is sent to the DSC 3012. "newJobOK" indicates that the PD printer 1000 is ready to receive a print request, and is sent to the DSC 3012.

<GetCapability>

FIGS. 9A and 9B depict views for explaining an actual example of a capability acquisition method of the PD printer 1000, which is issued from the DSC 3012 to the PD printer 1000.

FIG. 9A depicts a view for explaining a capability request command of the PD printer 1000 to be sent from the DSC 3012 to the PD printer 1000.

In the example of FIG. 9A, a capability acquisition request is issued by <getCapability> and </getCapability>, and an inquiry as to whether or not the PD printer 1000 has a layout print function as capability is issued by <layouts/> 901 bounded by <capability> and </capability>.

FIG. 9B shows an example of capability data returned from the PD printer 1000 to the DSC 3012 in response to the capability request in FIG. 9A.

In FIG. 9B, layout information 904 bounded by <layouts> 903 and <layouts/> 905 in capability information bounded by <capability> 902 and </capability> 906 notifies a layout function of the PD printer 1000.

As can be seen from FIG. 9B, in this embodiment, capability data are sent as 8-digit codes ("57000000", "57010000", "57020000") from the PD printer 1000 to the DSC 3012. In this embodiment, layout capability is specified as a code, the upper 2 digits of which start with "57", and the next 2 digits indicate layout information, i.e., the number of images that can be printed per one sheet. That is, the upper 4 digits "5701" indicate that a layout print process for printing one image per one sheet is allowed, and "5702" indicate that the printer has a layout print function for printing two images per one sheet. Note that the upper 4 digits "5700" indicate a mode which makes a layout print process using a default layout of the PD printer 1000. That is, in the example of FIG. 9B, the layout print capability data of the PD printer 1000 indicate that the printer has three different layout print functions, i.e., a layout print function of printing one image per one sheet, a layout print function of printing two images per one sheet, and the default layout print function of the PD printer 1000.

In FIGS. 9A and 9B, the method of exchanging capability data associated with the layout print function has been discussed. However, a function that can be confirmed by capability data is not limited to the layout print function. For example, there are various kinds of capability data: capability data about the types of sheets that can be printed by the PD printer 1000; capability data about the sheet sizes supported by the PD printer 1000; capability data about the file types of image data supported by the printer 1000; capability data indicating whether or not the printer 1000 can additionally print a date or file name to an image; capability data about print modes supported by the printer 1000; capability data about the presence/absence of automatic correction functions of an image supported by the printer 1000; and so forth.

However, a description of detailed communication specifications of these capability data will be omitted.

<Image Specifying Method>

A method of specifying an image upon printing an image will be explained below.

Information of the print condition is sent from the DSC 3012 to the PD printer 1000 using StartJob (a command for designating a print job), as has been explained using FIG. 7. An image to be printed is designated by a tag <fileID> (709 in FIG. 7). That is, a list of the handle numbers of print images is described in this tag to specify images to be printed. Since FIG. 7 exemplifies not designation of a layout print process for printing a plurality of images, but that of a print process for printing only one image, only one handle number (handle number "00000001") is described. However, in case of a print process for printing two images, two handle numbers each expressed by 8 digits are sent in parallel. After the handle numbers of images to be printed are sent to the PD printer 1000, the PD printer 1000 requests the DSC 3012 to send image files designated by these handle numbers prior to a print process. In this case, the PD printer 1000 must acquire information of images to prepare for reception of image files before it acquires them.

FIG. 10A shows an example of a command sent when the PD printer 1000 requests the DSC 3012 to send image data with a handle name "00000001".

FIG. 10B shows an example wherein the DSC 3012 sends image data to the PD printer 1000 in response to the request. In this case, the DSC 3012 sends information: image file type <fileType> and image file size <fileSize> (number of bytes) to the PD printer 1000.

More specifically, for example, when this command is implemented on PTP of USB, it is processed as follows. That is, the PD printer 1000 serving as a USB host receives "ObjectInfoDataset" of the handle numbers of designated images to be printed from the DSC 3012 serving as a USB slave. Note that this "ObjectInfoDataset" includes a plurality of data fields. For example, in case of acquisition of file type information, the file type can be specified based on the contents of "ObjectFormatCode" in these data fields. In PTP, "ObjectFormatCode" is expressed by a 4-digit hexadecimal code. An "ObjectFormatCode" table separately specifies a file type expressed by the code (e.g., JPEG, TIFF, GIF, or the like), and the file type can be specified based on this table. Also, a folder that stores a designated image to be printed can be specified from information of a data field of "ObjectInfoDataset".

Note that an overview of the file information acquisition method has been explained taking USB-PTP as an architecture under the transport layer as an example. Such file information can be generally acquired by most of interfaces although acquisition methods are different depending on interfaces.

Figure 11:
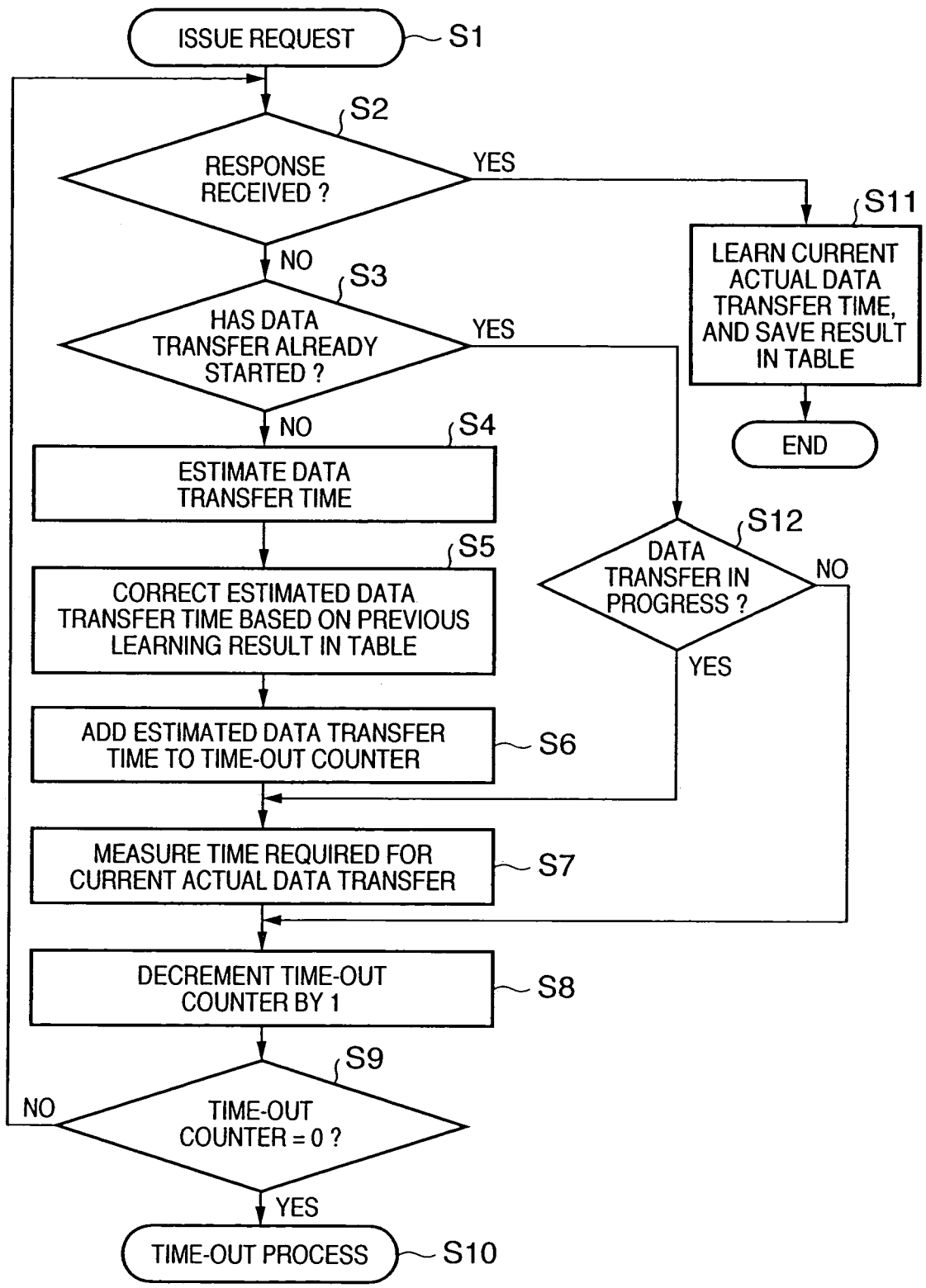
FIG. 11 is a flowchart for explaining the process in the DSC according to the first embodiment of the present invention.

FIG. 11 is a flowchart showing the process in the DSC 3012 according to the first embodiment of the present invention. A program for implementing this process is stored in the ROM 3101, and this process is implemented in a case where the CPU 3100 executes a control process according to this program.

When the DSC 3012 and PD printer 1000 are connected, a configuration process is done according to the specification (not shown) to establish a communication. Next, the two devices confirm each other if they are direct-print compatible products. The DSC 3012 acquires, from the PD printer 1000, capability data that can be implemented by the PD printer 1000 to present a UI to the user. The DSC 3012 forms a UI according to the acquired capability data and displays it on the display unit 2700, and shifts to an idle state to wait for a print command from the user. When the user determines an image which is to undergo a direct print process and a print specification by operating the UI of the DSC 3012, the DSC 3012 issues a print instruction to the PD printer 1000. The DSC 3012 converts the user's print instruction into a print job (i.e., "StartJob") and sends it to the PD printer 1000. Upon reception of this print job, the PD printer 1000 interprets the print job to acquire image data to be printed from the DSC 3012. As the types of information acquired at that time, "fileSize" information, which is required to assure the reception memory of the input image information and "fileType" information which is required to render the acquired image data are acquired (see FIG. 10B).

The subsequent process will be described with reference to the flowchart of FIG. 11.

As described above, the DSC 3012 acquires, from the PD printer 1000, capability data that can be implemented by the PD printer 1000, so as to present a UI to the user. In step S1, a request of a command (getCapability) of capability acquisition or the like is issued. At this time, as a duration of time-out from when this request is issued until a response is received from the PD printer 1000, a count value per sec is set to be "100", and a value "3000" or the like is set as a time-out counter.

Figure 12:
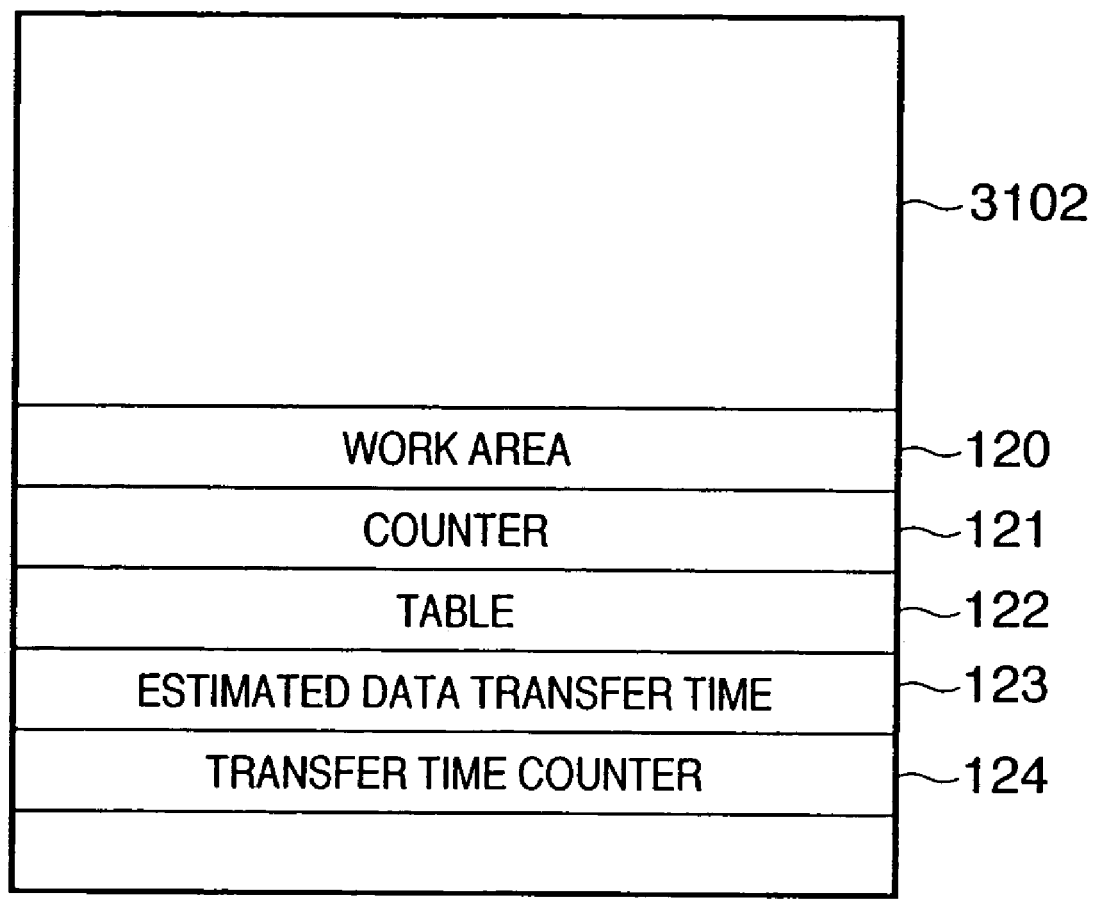
FIG. 12 depicts a view for explaining the memory map of a RAM of the DSC according to the first embodiment of the present invention.

FIG. 12 shows the data configuration of the RAM 3102, which stores data used to count this count value and the like.

Referring to FIG. 12, reference numeral 120 denotes a work area which temporarily stores various data during the control operation of the CPU 3100. Reference numeral 121 denotes a counter. The aforementioned count value is set in the counter 121, and is counted down under the control of the CPU 3100. Reference numeral 122 denotes a table to be described later. This table 122 stores learning values used to estimate a time required to transfer data to be transferred on the basis of the time actually required for data transfer. Reference numeral 123 denotes an estimated data transfer time for storing an estimation time required to execute the data transfer. Reference numeral 124 denotes a transfer time counter used to count an actual transfer time from the beginning to end of data transfer.

The flow advances to step S2 to check whether or not a response to the request transmitted in step S1 has been received from the PD printer 1000. If the response has been received, the flow advances to step S11 without any time-out process, and the learning result of an actual data transfer time (to be described later) is saved in the table 122, thus ending this process and starting the next process (not shown).

On the other hand, if it is determined in step S2 that a response has not been received from the PD printer 1000 yet, the flow advances to step S3 to check whether transfer of actual data by StartJob has already started. If the data transfer has already started, the flow advances to step S12; if the data transfer has not started yet, the flow advances to step S4 to estimate a time required to transfer data. Upon estimating the transfer time, a default table for describing a count value corresponding to an average transfer time of a data size to be transferred is stored in the ROM 3101, and an estimated time required for data transfer of the data size is acquired using the already acquired "fileSize" information. A count value corresponding to the estimated time is set in the estimated data transfer time 123.

The flow advances to step S5 to correct the estimated data transfer time set in the estimated data transfer time 123 on the basis of learning values based on previous data transfer, which are stored in the table 122. In this correction process, a difference from the average transfer time is learned on the basis of the times required to transfer previous actual data, which are stored in the table 122, and a count value corresponding to the difference can be referred to. The flow advances to step S6 and the value obtained in step S5 is added to the count value of the counter 121 set in step S1. In this way, the time required until a time-out is prolonged by the time required to transfer the current data. The flow advances to step S7, and measurement of the data transfer time is started so as to reflect the time required for the current transfer of actual data in the learning result. The data transfer time is measured by counting up the value of the transfer time counter 124, which is reset in advance. The flow advances to step S8 to decrement the value of the counter 121 by −1. It is determined in step S9 whether the value of the counter 121 has reached "0", i.e., if the estimated time required for data transfer has elapsed. If the value of the counter 121 is not "0", since the estimated time has not elapsed yet, the flow advances to step S2 to execute the next process while waiting for a response from the PD printer 1000. If it is determined in step S9 that the value of the counter 121 has reached "0" and a time-out is generated, the flow advances to step S10 to execute a time-out process. In the time-out process, a process for disabling the request issued in step S1, and issuing, for example, a status acquisition request or the like that does not require any data transfer to the PD printer 1000 to check the status of the PD printer 1000 is executed.

On the other hand, if it is determined in step S3 that data transfer has already started, the flow advances to step S12 to check whether the data transfer is still in progress. If the data transfer is still in progress, the flow advances to step S7 to count up the transfer time counter 124, and the flow advances to step S8; otherwise, the flow advances to step S8 to execute a decrement process of the counter 121.

If it is determined in step S2 that the response is received from the PD printer 1000, the flow advances to step S11 to add the current transfer time counted by the transfer time counter 124 as a learning value of the table 122 together with the current data transfer size. Note that a detailed description of a data update process of the table 122 will be omitted. For example, when the number of samples has reached a predetermined value, the average value of data transfer times may be calculated for respective data transfer sizes within a predetermined range, and the table 122 may be updated to store, for example, a data transfer time (sec) for the data transfer size range from 10 kbytes to 20 kbytes.

With the above process, the time required for actual data transfer is accurately estimated, and the time-out of a response time from the PD printer can be determined in accordance with the estimated data transfer time.

Second Embodiment

Figure 13:
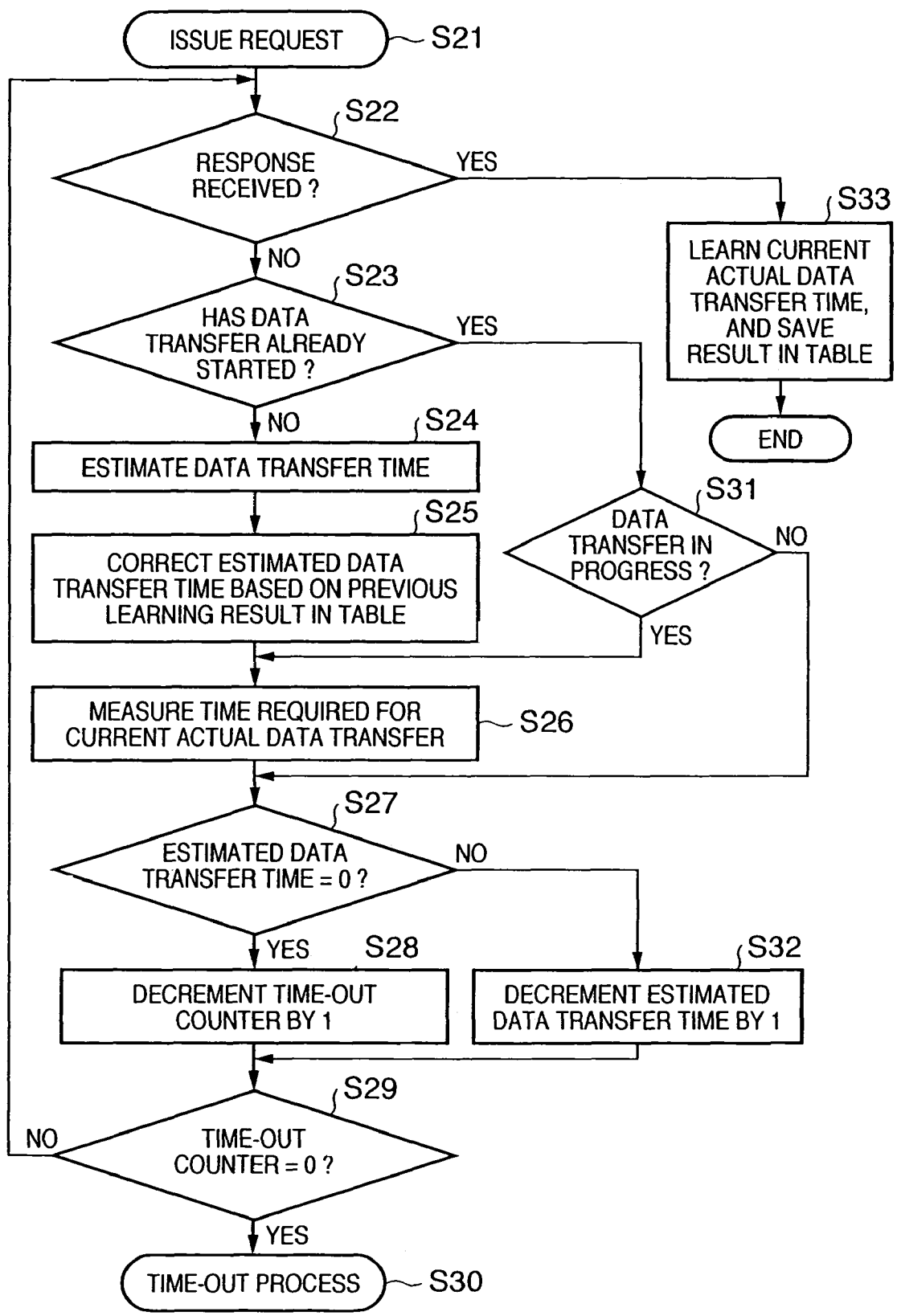
FIG. 13 is a flowchart for explaining the process in the DSC according to the second embodiment of the present invention.

FIG. 13 is a flowchart showing the process of the DSC 3012 according to the second embodiment of the present invention. Note that the program for implementing this process is stored in the ROM 3101, and the process is implemented while the CPU 3100 executes a control process according to the program. The second embodiment is characterized in that measurement of a duration of time-out by the counter 121 is interrupted while the data transfer is in progress.

As described above, the DSC 3012 acquires, from the PD printer 1000, capability data that can be implemented by the PD printer 1000, so as to present a UI to the user. For this purpose, a request of a command (getCapability) of capability acquisition or the like is issued (S21). At this time, as a duration of time-out from the time when the request is issued until a response is received from the PD printer 1000, a value "3000" or the like is set in the counter 121 to have a count value per sec as "100". Also, the estimated data transfer time 123 is reset to "0".

The flow advances to step S22 to check whether the response to the request transmitted in step S21 has been received from the PD printer 1000. If the response has already been received, the flow advances to step S33 without any time-out process, and the learning result of an actual data transfer time (to be described later) is saved in the table 122, thus ending this process and starting the next process (not shown).

On the other hand, if it is determined in step S22 that the response has not been received from the PD printer 1000 yet, the flow advances to step S23 to check whether the transfer of actual data by StartJob has already been started. If it is determined that the data transfer has not been started yet, the flow advances to step S24 to estimate a time required to transfer the data and to set the estimated time in the estimated data transfer time 123. Upon estimating the data transfer time, a table for describing a count value with respect to the data size, is stored in the ROM 3101. The count value corresponds to an average transfer time required to transfer the data, and the count value can be retrieved from the table using the already acquired file size information "fileSize" (data size).

The flow advances to step S25 to correct the estimated transfer time 123 on the basis of the actually data transfer times which are previously measured, and to set the corrected time in the counter 121. In this correction process, actual times required for previous data transfer are measured using the transfer time counter 124, and the count values that learn differences between the average data transfer time and the measured time, with respect to the data size, are stored in the table 122. Then, the differences can be retrieved with reference to the table 122. The flow advances to step S26 to count up the transfer time counter 124 so as to measure the actual data transfer time, thereby reflecting the actual time required for current data transfer in the learning result. The flow then advances to step S27.

On the other hand, if it is determined in step S23 that the data transfer has already started, the flow advances to step S31 to determine whether the data transfer is in progress. If the data transfer is in progress, the flow advances to step S26 to count up the transfer time counter 124 so as to measure the actual time required to transfer the data, and the flow advances to step S27; otherwise, the flow advances to step S27.

It is determined in step S27 whether the value of the estimated data transfer time 123 is "0". If the value of the estimated data transfer time 123 is "0", since it is estimated that data transfer is complete, the flow advances to step S28 to decrement the value of the counter 121 by "1" so as to count down the duration of time-out while no response is received. The flow advances to step S29 to determine whether the value of the counter 121 has reached "0", for example, the time-out is occurred. If no time-out is occurred, the flow returns to step S22; otherwise, the flow advances to step S30 to execute the time-out process.

If it is determined in step S27 that the value of the estimated data transfer time 123 is not "0", i.e., if it is estimated that the data transfer is not complete yet, the flow advances to step S32 to decrement the counter value of the estimated data transfer time 123 by "1" without counting down the counter 121 used to measure the time until the response is arrived. In this manner, during an interval in which it is estimated that the data transfer is in progress, the time-out counter 121 is not counted down. Hence, no time-out is occurred during data transfer.

With the above process, since the count-down process of the counter used to determine a time-out is interrupted by the estimated data transfer time, generation of an unwanted time-out can be suppressed.

In the above embodiments, it is determined by checking if transfer of actual data based on StartJob has started, whether or not the data transfer has started. In addition, the checking process may be attained by seeing if an object to be transferred is an image file with a file name "XXXXXXX.001" or the like, if the file type is JPEG, if the data transfer direction is bulk IN, if the USB transfer method is bulk transfer, if the PTP object handle is JPEG, and so forth.

Other Embodiments

The objects of the present invention can also be achieved by supplying a storage medium, which records a program code of a software program to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. As the storage medium for supplying the program code, for example, a floppy® disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application No. 2003-298798 filed on Aug. 22, 2003, which is hereby incorporated by reference herein.

What is claimed is:

1. A recording system in which an image supply apparatus and a recording apparatus communicate via a communication interface, for transmitting an image data file from the image supply apparatus to the recording apparatus and recording, the system comprising: an issuance unit that issues a request for the image data file to be transmitted from the image supply apparatus to the recording apparatus, after applications executed in the image supply apparatus and the recording apparatus establish a communication procedure between the image supply apparatus and the recording apparatus; a transmission unit that transmits the image data file from the image supply apparatus to the recording apparatus corresponding to the request; an obtaining unit that obtains file size information of the image data file to be transmitted by the transmission unit; a prediction unit that predicts a time period in which the transmission unit will transmit the image data file, based on the file size information of the image data file obtained by the obtaining unit wherein the prediction unit comprises: a table that stores a data transfer time period corresponding to the size information of the image data file; a measurement unit that measures a time period required for transfer of the image data file; and a correction unit that corrects the data transfer time period stored in the table on the basis of the time period measured by the measurement unit, wherein the prediction unit predicts the time period required for transfer of the image data file transfer involved in the request on the basis of the data transfer time period corrected by the correction unit; a setting unit that sets a time period of a time-out based on the time period predicted by the prediction unit; and a shifting unit that shifts to a time-out processing for disabling the request, in a case where a response of completion of transmission of the image data file is not returned from the recording apparatus before the time period set by the setting unit has elapsed wherein the communication interface has a first communication layer in which the image supply apparatus and the recording apparatus perform data transfer and a second communication layer above the first communication layer in which the data transfer in the first communication layer is controlled, wherein processes of the prediction unit, the setting unit and the shifting unit are executed in the second communication layer, and wherein the second communication layer can recognize the request and a response to the request, but can not recognize whether or not the data transfer is being executed in the first communication layer.

2. An image supply apparatus for communicating with a recording apparatus via a communication interface, and for transmitting an image data file to the recording apparatus to cause the recording apparatus to record the an image based on the image data file, the image supply apparatus comprising: a reception unit that receives a request for the image data file to be transmitted to the recording apparatus, after an application executed in the image supply apparatus establishes a communication procedure with the recording apparatus; an obtaining unit that obtains size information of the image data file to be transmitted to the recording apparatus corresponding to the request; a prediction unit that predicts a time period in which the image data file will be transmitted to the recording apparatus, based on the size information obtained by the obtaining unit, wherein the prediction unit comprises: a table that stores a data transfer time period corresponding to the size information of the image data file; a measurement unit that measures a time period required for transfer of the image data file; and a correction unit that corrects the data transfer time period stored in the table on the basis of the time period measured by the measurement unit, wherein the prediction unit predicts the time period required for transfer of the image data file transfer involved in the request on the basis of the data transfer time period corrected by the correction unit; a setting unit that sets a time period of a time-out based on the time period predicted by the prediction unit; and a shifting unit that shifts to a time-out processing for disabling the request, in a case where a response of completion of image data transmission of the image data file is not returned from the recording apparatus before the time period set by the setting unit has elapsed wherein the communication interface has a first communication layer in which the image supply apparatus and the recording apparatus perform data transfer and a second communication layer above the first communication layer in which the data transfer in the first communication layer is controlled, wherein processes of the prediction unit, the setting unit and the shifting unit are executed in the second communication layer, and wherein the second communication layer can recognize the request and a response to the request, but can not recognize whether or not the data transfer is being executed in the first communication layer.

3. A control method for a recording system in which an image supply apparatus and a recording apparatus communicate via a communication interface, for transmitting an image data file from the image supply apparatus to the recording apparatus and recording, the method comprising: an issuance step of issuing a request for the image data file to be transmitted from the image supply apparatus to the recording apparatus, after applications executed in the image supply apparatus and the recording apparatus establish a communication procedure between the image supply apparatus and the recording apparatus; a transmission step of transmitting the image data file corresponding to the request from the image supply apparatus to the recording apparatus; an obtaining step of obtaining size information of the image data file to be transmitted in the transmission step; a prediction step of predicting a time period in which the transmission step will transmit the image data file, based on the size information of the image data file obtained in the obtaining step, wherein the prediction step comprises: a measurement step of measuring a time period required for transfer of the image data file; and a correction step of correcting a data transfer time period stored in a table for storing a data transfer time period corresponding to the size information of the image data file, on the basis of the time period measured in the measurement step, wherein in the prediction step, the time period required for the image data transfer involved in the request is predicted on the basis of the data transfer time period corrected in the correction step; a setting step of setting a time period of a time-out based on the time period predicted in the prediction step; and a shifting step of shifting to a time-out processing for disabling the request, in a case where a response of completion of image data transmission of the image data file is not returned from the recording apparatus before the time period set in said the setting step has elapsed: wherein the communication interface has a first communication layer in which the image supply apparatus and the recording apparatus perform data transfer and a second communication layer above the first communication layer in which the data transfer in the first communication layer is controlled, wherein processes of the prediction step, the setting step and the shifting step are executed in the second communication layer, and wherein the second communication layer can recognize the request and a response to the request, but can not recognize whether or not the data transfer is being executed in the first communication layer.

4. A computer-executable program stored on a non-transitory computer-readable medium, for causing a computer to implement a control method according to claim 3.

5. A control method of an image supply apparatus for communicating with a recording apparatus via a versatile interface and transmitting an image data file to the recording apparatus to cause the recording apparatus to record an image based on the image data file the method comprising: a reception step of receiving a request for the image data file to be transmitted to the recording apparatus; an obtaining step of obtaining size information of the image data file to be transmitted to the recording apparatus corresponding to the request; a prediction step of predicting a time period in which the image data file will be transmitted to the recording apparatus, based on the size information obtained in the obtaining step, wherein a table stores a data transfer time period corresponding to the size information of the image data file; and wherein the prediction step comprises a measurement step of measuring a time period required for transfer of the image data file; and a correction step of correcting the data transfer time period stored in the table on the basis of the time period measured in the measurement step, and wherein in the prediction step the time period required for transfer of the image data file transfer involved in the request is predicted on the basis of the data transfer time period corrected by the correction step; a set step of setting a time period of a time-out based on the size information obtained in the obtaining step; and a shifting step of shifting to a time-out processing for disabling the request, in a case where a response of completion of transmission of the image data file is not returned from the recording apparatus before the time period set in said the set step has elapsed wherein the communication interface has a first communication layer in which the image supply apparatus and the recording apparatus perform data transfer and a second communication layer above the first communication layer in which the data transfer in the first communication layer is controlled, wherein processes of the prediction step, the setting step and the shifting step are executed in the second communication layer, and wherein the second communication layer can recognize the request and a response to the request, but can not recognize whether or not the data transfer is being executed in the first communication layer.

6. A computer-executable program stored on a non transitory computer readable medium, for causing a computer to implement the method according to claim 5.

7. A non-transitory computer readable medium for storing the program according to claim 6.

8. A non-transitory computer-readable recording medium for storing the program according to claim 4.

* * * * *